United States Patent
Grodzicki et al.

(10) Patent No.: US 9,407,665 B2
(45) Date of Patent: Aug. 2, 2016

(54) CONTRACT BROKER FOR SECURE AD-HOC PERSONAL DATA SHARING

(71) Applicant: Demandware, Inc., Burlington, MA (US)

(72) Inventors: Lawrence Grodzicki, Brentwood, NH (US); Peter Pritchard, Harvard, MA (US)

(73) Assignee: Demandware Inc., Burlington, MA (US)

( * ) Notice: Subject to any disclaimer, the term of this patent is extended or adjusted under 35 U.S.C. 154(b) by 0 days.

(21) Appl. No.: 14/507,988

(22) Filed: Oct. 7, 2014

(65) Prior Publication Data

US 2016/0099970 A1 Apr. 7, 2016

(51) Int. Cl.
*H04N 7/16* (2011.01)
*G06F 17/30* (2006.01)
*G06F 7/04* (2006.01)
*H04L 29/06* (2006.01)
*G06Q 20/20* (2012.01)

(52) U.S. Cl.
CPC ............... *H04L 63/20* (2013.01); *G06Q 20/20* (2013.01); *H04L 63/10* (2013.01)

(58) Field of Classification Search
CPC ................................................ G06F 17/30873
USPC ........................................................... 726/29
See application file for complete search history.

(56) References Cited

U.S. PATENT DOCUMENTS

| | | | |
|---|---|---|---|
| 6,571,294 B2 | 5/2003 | Simmon et al. | |
| 7,200,578 B2 | 4/2007 | Paltenghe et al. | |
| 7,221,910 B2 | 5/2007 | Ishii et al. | |
| 7,784,684 B2 | 8/2010 | Labrou et al. | |
| 7,822,688 B2 | 10/2010 | Labrou et al. | |
| 7,988,037 B2 | 8/2011 | Yach | |
| 8,157,161 B2 | 4/2012 | Yach | |
| 8,255,984 B1 | 8/2012 | Ghostine et al. | |
| 8,353,447 B2 | 1/2013 | Yach | |
| 2002/0026500 A1 | 2/2002 | Kanefsky et al. | |

(Continued)

FOREIGN PATENT DOCUMENTS

WO  WO2009144247 A1  12/2009
WO  WO2013140196 A1  9/2013

OTHER PUBLICATIONS

Mirja-Riitta; Metadata Based Annotation Infrastructure offers Flexibility and Extensibility for Collaborative Applications and Beyond; Year:2006; MIT Laboratory for Computer Science; p. 1-4.*

(Continued)

*Primary Examiner* — Monjour Rahim
(74) *Attorney, Agent, or Firm* — Intrinsic Law Corp.; Ibrahim M. Hallaj

(57) ABSTRACT

The present disclosure is directed to a system and method for sharing sensitive personal data such as personally identifying data and financial data of a user. In an aspect the exchange of data is facilitated by a trusted contract broker, which is in communication with a client device and an external application. The contract broker having access to needs and rules for each of the client device and the external application, and the contract broker brokering the secure exchange of data between the client device and the contract broker according to said needs and rules. In an aspect, an electronic representation of a subset of personal data needed to satisfy an ad-hoc rule of said external application is generated in a client device and delivered to the external application.

18 Claims, 14 Drawing Sheets

(56) References Cited

U.S. PATENT DOCUMENTS

| | | | |
|---|---|---|---|
| 2002/0107007 A1 | 8/2002 | Gerson | |
| 2003/0019935 A1 | 1/2003 | Giannulli | |
| 2004/0133445 A1* | 7/2004 | Rajan | G06Q 10/067 717/108 |
| 2004/0254993 A1 | 12/2004 | Mamas | |
| 2005/0071674 A1* | 3/2005 | Chou | H04L 29/06027 726/4 |
| 2006/0047847 A1 | 3/2006 | Saccocio | |
| 2006/0088166 A1 | 4/2006 | Karusawa | |
| 2006/0112014 A1 | 5/2006 | Azeem | |
| 2007/0017969 A1 | 1/2007 | Wilson, III | |
| 2007/0084933 A1 | 4/2007 | Zhang et al. | |
| 2007/0102521 A1 | 5/2007 | Petersson | |
| 2007/0129959 A1 | 6/2007 | Bransky et al. | |
| 2008/0116278 A1 | 5/2008 | Epshteyn | |
| 2008/0307504 A1* | 12/2008 | Cisler | H04L 63/0823 726/4 |
| 2009/0041353 A1 | 2/2009 | Hoff et al. | |
| 2009/0083740 A1* | 3/2009 | Mathew | G06F 9/5055 718/102 |
| 2009/0094125 A1* | 4/2009 | Killian | G06Q 20/0855 705/17 |
| 2009/0108056 A1 | 4/2009 | Faust et al. | |
| 2009/0254971 A1 | 10/2009 | Herz et al. | |
| 2009/0300549 A1 | 12/2009 | Wang et al. | |
| 2009/0307232 A1 | 12/2009 | Hall | |
| 2010/0042846 A1* | 2/2010 | Trotter | G06F 21/31 713/182 |
| 2010/0094996 A1 | 4/2010 | Samaha | |
| 2010/0257067 A1 | 10/2010 | Chan | |
| 2011/0047593 A1* | 2/2011 | Ausems | G06Q 20/0453 726/1 |
| 2012/0129452 A1 | 5/2012 | Koh et al. | |
| 2012/0130839 A1* | 5/2012 | Koh | G06Q 20/352 705/26.1 |
| 2012/0168497 A1 | 7/2012 | Yach | |
| 2012/0187184 A1* | 7/2012 | Challa | G06K 19/06112 235/375 |
| 2012/0211561 A1 | 8/2012 | Lieberman et al. | |
| 2012/0316950 A1 | 12/2012 | Laporte et al. | |
| 2013/0126619 A1 | 5/2013 | Del Fiume et al. | |
| 2013/0186954 A1 | 7/2013 | Denny | |
| 2014/0006194 A1* | 1/2014 | Xie | G06Q 20/3278 705/21 |
| 2014/0070923 A1 | 3/2014 | Forster et al. | |
| 2015/0082432 A1* | 3/2015 | Eaton | H04L 47/785 726/23 |

OTHER PUBLICATIONS

United States International Search Authority, "PCT/US2014/059407 International Search Report", Jan. 16, 2015, WIPO.

Karnouskos et al., "SeM oPS: A Global Secure Mobile Payment Service", 2005.

Rice et al., "A Proposed Architecture for Secure Two-Party Mobile Payment", p. 88-93.

Zhang et al., "A User-Centric M-Payment Solution".

N. Asokan, "Anonymity in a Mobile Computing Environment", 1995, p. 200-204, IEEE.

Smart Card Alliance, "The Mobile Payments and NFC Landscape: A U.S. Perspective", A Smart Card Alliance Payments Council White Paper, Sep. 2011, Publication No. PC-11002, www.smartcardalliance.org.

Labrou et al., "Wireless Wallet", Proceedings of the First Annual International Conference on Mobile and Ubiquitous Systems: Networking and Services, 2004, IEEE.

* cited by examiner

CONTRACT BROKER FOR SECURE AD-HOC PERSONAL DATA SHARING

TECHNICAL FIELD

This invention relates to the sharing of personal data such as personally identifying information and financial data, and more particularly to the exchange of such data between parties, according to ad-hoc rules and needs of the parties, so as to minimize the risk of compromise of the personal data in the context of a transaction between the parties.

BACKGROUND

We increasingly rely on electronic transactions in commerce, banking and other aspects of daily life. This has lead to a need to exchange personal data with others, including sharing personally identifying information and financial information. This information is generally considered sensitive or confidential as its unwanted disclosure to unauthorized persons can expose the owner of the information (and others associated with the owner) to liability, economic loss, and other personal and financial risks. Accordingly, most people and organizations guard their personal data to secure it against accidental or intentional loss. But there are times when we must relinquish some personal data in order to conduct a transaction with a party that requires our personal data to consummate the transaction.

FIG. 1 illustrates an exemplary transaction according to the prior art. A customer and/or customer device 100 relay personal data 110 (depicted by dashed lines) to a merchant employee and/or point of sale/point of service (POS) device 120 as required to conduct a transaction (e.g., purchase an item from a retail shop). However, the personal data 110 (whether audible, visual or transmitted electronically from a wireless device) is also at risk of exposure to third parties and/or their devices 130 who may be in the vicinity of or privy to the transaction and communications between the customer 100 and the merchant 120. If the transaction is electronic, the personal data 110 sent from the customer 100 to the merchant 120 is usually in the form of an electronic file or message. The electronic file or message will typically include for example the customer's personally identifying information and financial data, which the customer usually cannot or does not modify for the purpose of the transaction. For example, if the transaction requires the customer's contact information, this information is typically in an electronic file containing all of the customer's contact information (name, address, email, phone, etc.) and the transmission of this information will commonly include sensitive personally identifying information beyond what the transaction actually needs and beyond what the customer would like the merchant to receive—and certainly more than the customer wishes third party bystanders 120 to receive.

There is currently no practical means for flexibly facilitating secure transactions without revealing to other parties sensitive personally identifying information or financial information (generally, personal data) in the context of device-enabled transactions. Also, with regard to local sharing of personal data (e.g., personally identifying information or financial data), existing measures to reduce the risks of exposure of personal data, such as privacy screens at POS terminals and secure key pads, still do not eliminate the risk of exposure of certain personal data such as the data owner's name, address, identification card, credit card information, telephone number, email address, signature, and other data. Other existing systems do not offer an owner of the personal data any options for selectively sharing his or her information with other parties. The owner is required to hand a card or transmit an electronic file to the other parties which contains a pre-determined set of personal data that the owner cannot limit or customize for the purpose of a given transaction or context.

SUMMARY

In an aspect, the invention is directed to method for machine-assisted execution of a transaction, comprising providing a brokering server to broker exchanges of personal data between a client device and an external application; storing a record of active connections between said client device and said external application in said brokering server; encoding a plurality of ad-hoc rules representing ad-hoc conditions required by said external application to complete said transaction in the form of needs metadata; delivering said needs metadata to said client; receiving personal data from said client corresponding to said needs metadata; and returning said personal data corresponding to said needs metadata and representing said ad-hoc rules to said external application by way of said brokering server so that the personal data does not need to pass directly from said client to said external application.

Another embodiment is directed to a method for conducting a transaction, comprising detecting, using a location detection system, the presence of a client device in or proximal to a point of sale containing an external application; receiving, at a brokering server, from said external application, a plurality of metadata representing a state of said external application and representing a plurality of ad-hoc rules of said external application required by said external application to complete said transaction; providing said metadata from said brokering server to said client device; receiving from said client device a plurality of personal data corresponding to said metadata and said ad-hoc rules; formatting said personal data according to a format specified in said metadata so as to generate a set of formatted personal data corresponding to said metadata and ad-hoc rules; returning said formatted personal data from said brokering server to said external application so as to satisfy said ad-hoc rules and complete said transaction.

Yet another aspect is directed to a method for securely sharing selected personal data, comprising presenting to a user a set of personal data stored in a personal communication device; receiving at least one user input indicative of a subset of said personal data selected by said user for sharing with another party; annotating the subset of personal data to show which selected personal data will be shared with said other party; receiving further user input indicating that the user has completed selecting the subset of personal data to be shared; and generating an electronic representation of said subset of personal data, said electronic representation encoding said selected personal data but not encoding other personal data that was not selected.

Other aspects are directed to a personal communication device, comprising a processor configured to execute computer-readable instructions; an input/output module configured to receive user input signals from a user of said device representative of a choice of said user, and to deliver corresponding user input signals to said processor; a storage unit coupled to said processor comprising at least one data store and including a store of personal data and a store of a selected subset of said personal data, said subset of personal data corresponding to said user input signals; a display screen configured to receive display signals from said processor, said display screen further configured to illuminate segments of said display in accordance with the selected subset of personal data.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

Figure 1:
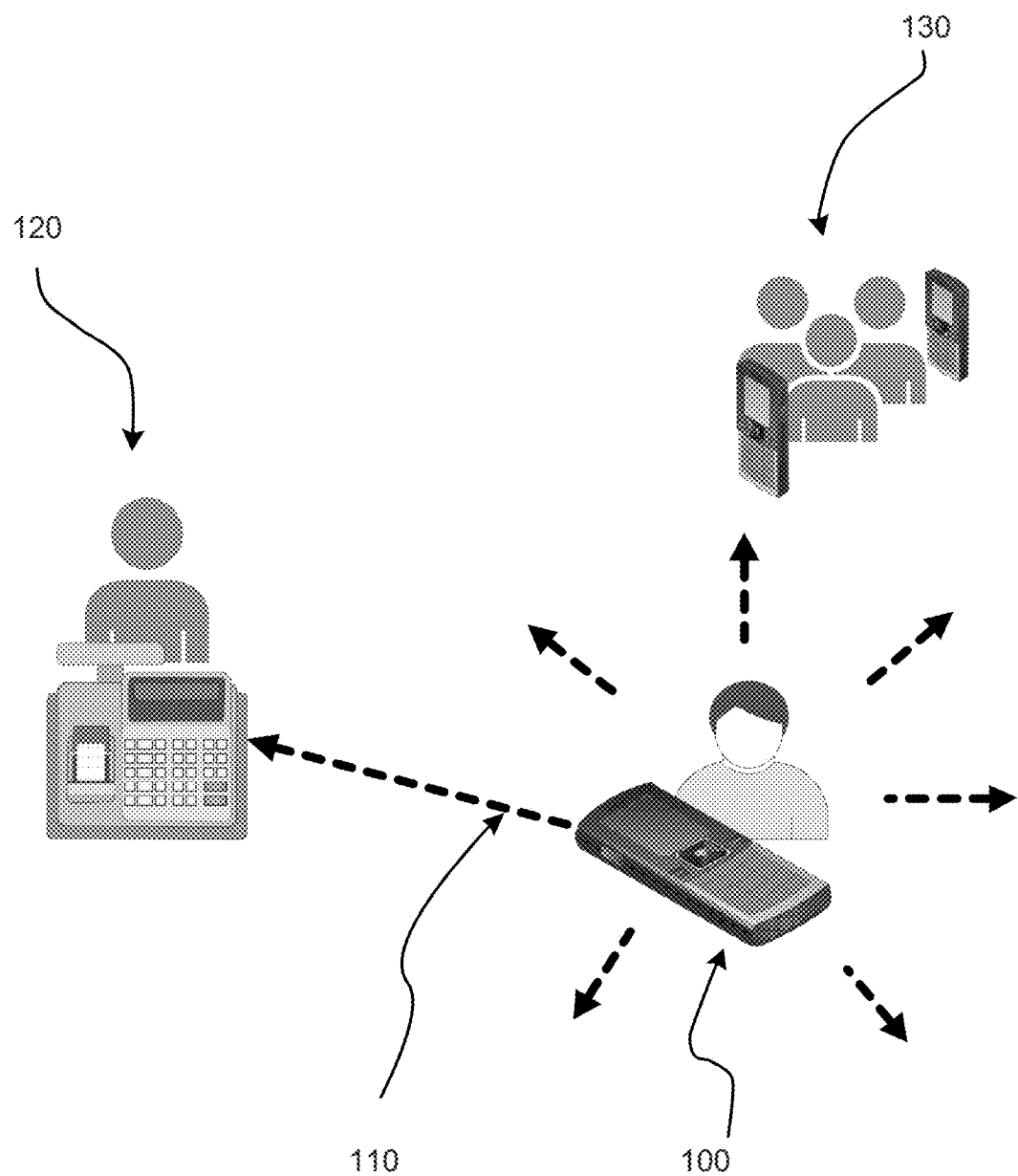
FIG. 1 illustrates a retail transaction requiring the customer to provide personal data at the point of sale (POS)

The present disclosure recognizes that, in the context of device-enabled transactions, consummating each transaction could require different conditions. Different electronic transactions could require completely or partially different information to be exchanged between the parties to the transaction. For example, a first transaction may require an email to be sent from a seller to a buyer confirming shipment of goods, so this transaction would call for the buyer to provide its email address to the seller. In a second transaction, a home services provider (e.g., landscaper) might not need to send email to a the customer, but it would require the customer to provide his or her home address to the services provider so that the landscaper can come visit the property in question.

Personal data (e.g., personally identifying information or financial information) is generally not publicly known and contains sensitive or valuable information that can cause financial loss, liability, embarrassment, or other injury to the owner of the personal data if it were compromised. For security and privacy reasons, an owner of personal data chooses to release the minimum amount of personal data to the minimum number of other parties to avoid intentional or accidental loss or misuse of the personal data. One aspect of this invention helps reduce the amount and type of personal data released to parties during a transaction to the minimum amount and type necessary to conduct the transaction. Another aspect of this invention relaxes or eliminates the need for an owner of personal data to directly convey his or her raw personal data to other parties in the context of a transaction by exploiting a 'contract broker'. The contract broker includes a machine, such as a computer or server device, which is programmed and connected through a network to receive, process and send out information to assure the parties in a transaction that they have received and/or delivered the necessary data for securely conducting the transaction.

In some aspects, the present invention addresses and solves technical and security challenges presented when a user client device interacts with an external application requiring provision of sensitive personal data generally from the user client to the external application. Personal data may then be compromised as discussed above, including during location-aware context changes.

We look at an example of a customer user shopping in a retail environment. If the user (or user client device) is interacting with an application and listening for location or context driven messages (e.g., product promotions, assistive aid messages) then positioning devices such as 'iBeacons' or radio frequency identification (RFID) tags can trigger product information notifications. Discovered RFID tags can trigger calls to the contract broker, which communicates to an in-store application using the UUID of a given discovered product in the store.

Other applications of the present systems and methods abound. They can facilitate secure reliable communication, including communication of personal data, to enable users to interact with their environments (e.g., home systems, appliances, cars) through their personal communication devices (client devices) by way of the present contract broker. Busy persons, persons with security concerns, and persons with disabilities who struggle to interact according to conventional means with their surroundings would find great utility in the present systems and methods. Everyday users will also benefit in the added convenience and security of interacting with entities, machines and things around them by the present systems and methods. In another example, a shopper passing in the vicinity of a tagged product of interest to the shopper can be alerted to the product in real time by the present technique. The shopper could optionally receive targeted offers or other information relating to the anticipated transaction regarding the product of interest. In yet another example, a user carrying a device could cause an automatic display of relevant information on an interactive kiosk in proximity to the user. The kiosk could display and offer information and services to the user according to known needs and rules of engagement set by the user and/or service provider. In still another example, the present systems and methods enable a mobile device user to securely put out a product or service inquiry that the devices in his or her environment (or a sales associate equipped with a suitable external application terminal) can respond to according to a rule set coordinated through the present contract broker.

While the above examples primarily derive from a need of the user of a client device, a retailer, vendor, or other entity or apparatus can make requests through the present contract broker to which the client user responds. For example, a retail store can send out a payment request directed at a customer. The customer though his or her client device will receive notification of the payment request and decide how to make payment to the store through his or her mobile client device. In this example, no need to show or swipe a credit card (or for that matter to carry a card, which could be lost or stolen), but instead, the contract broker will facilitate payment using the client user's device alone. In this way, the confidential personal data containing the payment method information is securely kept on the user's client device and not in the store's POS system. In another example, a merchant needing shipping information for delivery of purchased products may send out a shipping address form (or equivalent request) specifying the needed information. The contract broker can then seek the appropriate client device (e.g., using a unique Session ID) and securely obtain and provide only the necessary personal data to fill out the shipping address form. These are merely examples to illustrate the nature and utility of the present systems and methods, but it can be seen that interacting parties such as vendors and third party external application providers may initiate context specific need requests to the client device of a user through the instant contract broker infrastructure.

Figure 2:
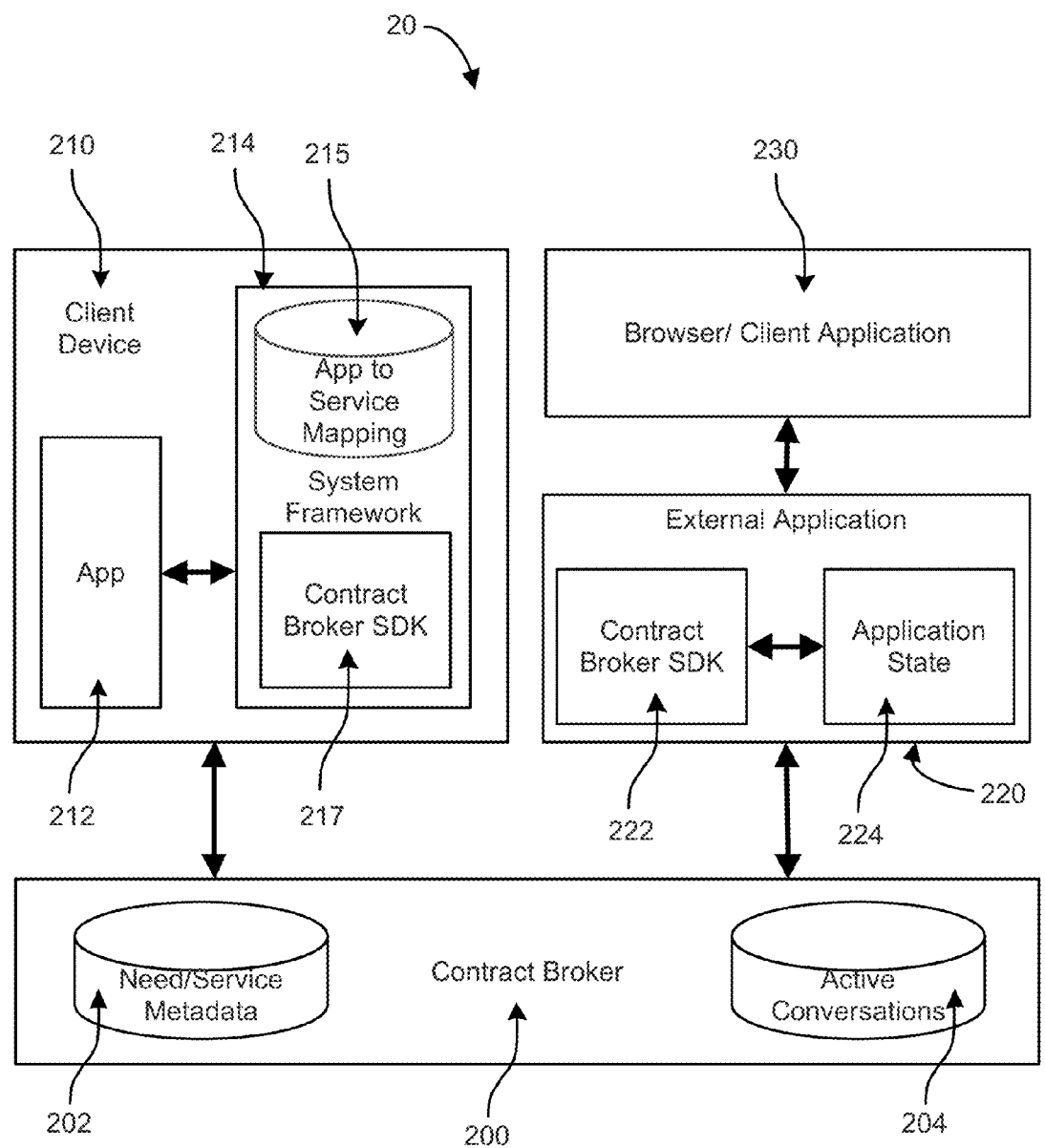
FIG. 2 illustrates an architecture including a contract broker in communication with a client device and external application.

FIG. 2 illustrates a general exemplary embodiment of architecture 20 for achieving the present aims. A contract broker 200 is installed in a computer device such as a server or similar computing apparatus that may be referred to as a contract broker server for the sake of simplification. The contract broker has both a structure and a function, which in operation allows secure brokered interaction between a client device and third party (external) applications. In an aspect, the contract broker 200 can be considered a de-coupled application or device registration apparatus and service to facilitate such interactions or transactions. The contract broker server may comprise a server processor (or multiple processors), and also having at least one data store in a digital memory storage device (or multiple storage devices) coupled to the contract broker server's processor. The construction and arrangement of the contract broker server is flexible, and can include components locally in a same apparatus or distributed as would be appreciated by one of skill in the art. The data store(s) on the contract broker 200 include a needs/service metadata store 202 and an active conversations store 204, which will be described in further detail below.

The data stores 202, 204 depicted (and those in the further embodiments described below) are representative of information and/or instructions generated, kept and exchanged by the components of the system 20. The need/service metadata is indicative of and represents the information needed by the contract broker or the external application. So for example, if the external application requires an address, the needs/service metadata can indicate this and indicate if any particular format is required for the address, e.g., "Address:20characters: ASCII". The active conversations represent trusted relationships with external applications 230.

The contract broker 200 allows interaction with other modules using a number of methods. Utility applications may configures to support generic information sharing with the contract broker. Standard Internet communications can be carried out using a REST API. Web sites may interact with the contract broker using a JavaScript API and a centralized contract broker could connect disparate entities such as to connect a Web application and a mobile client device. Interacting entities may also be configured to exchange data through the contract broker using real time point-to-point communication protocols. In another aspect, the present architecture can support point-to-point device discovery, which allows products, appliances, vehicles, and other suitably equipped machines to initiate secure interactions based on proximity. In a particular example, this is done by a location-sensitive apparatus such as a device with 'iBeacon' capability or RFID or Bluetooth capability.

The contract broker is in communication with a client device 210. The client device may be disposed in a client computing apparatus and preferably in a personal communication client device, e.g., smartphone, tablet, etc. The design and configuration of the client device is according to the present description and may include conventional hardware and software elements found in such personal communication devices, but in addition, will include the present new components that may be implemented in hardware/firmware/software as appropriate for a given application.

Client device 210 includes any processing and data storage and communication infrastructure required to perform the present methods, and in addition includes one or more instruction groups which can be programmed, compiled, loaded and executed and which are generally referred to as an "app" 212, or a client app. The app 212 may interact with other apps or software applications or operating systems running on the client device 210. Therefore, the client device 210 includes a system framework 214. In turn, system framework 214 may comprise a contract broker software developer kit (SDK) 217 and an app-to-service mapping data store and instructions and data 215. The illustrated app-to-service element is representative of data, instructions and information indicative of the range of services available to or exposed to the client, and if communicating client needs, it can indicate what set of needs the client is seeking. Client device 210 can be any of a general class of personal communication device. Client device 210 can also be a personal assistive device and can be used to convey state changes and requirements (needs) of other applications in architecture 20. Therefore, in an embodiment, the client device 210 may act as a personal assistive aid to a user who has special needs and may provide audible output responsive to said system changes and needs to users with visual impairments, and so on. This can be applied to any system architecture, including Web based, app, kiosk, and other system environments. The client device 210 can thus be used to tell its user what actions are needed or permitted in a given context based on requirements and requests by external applications of architecture 20.

An external application 220 is also in communication with the contract broker 200. The external application 220 can be included in an interacting entity or apparatus, which can include an application user, web site, point of sale (POS) system, automated teller machine (ATM), hospital terminal, doctor's office terminal, public kiosk, vending machine, an appliance, utility control center (lights, climate control system), public computer, security system, automobile, restaurant ordering and/or payment terminal, and so on. The external application 220 can run on a processor having an operating system, which may be a commercial set of software or a custom set of software, including for example embedded systems. The external application 220 can be running on a conventional server computer in some instances. In other instances it can be installed on household, medical, military, industrial, or workplace machinery and equipment. In yet other instances, the external application can be installed in hardware and/or software of a vehicle such as an automobile.

The external application 220 includes a state of the external application, which is embodied in an application state 224 and which can be affected by and affect other components of the external application 220 (e.g., exchange data and instructions) therewith. The state of an external application is meant to represent its needs or rules-based input/output condition. For example, a web page may have a state defined by its output or by the input it is waiting the user to enter into the web page. Another type of external application may have a state which is defined by the metadata it presents indicative of the user data it is expecting to receive. Typical external applications may represent a condition that a merchant won't let a customer check out without receiving payment confirmation, or that a product cannot ship without a shipping address, and so on.

The external application 220 can be used to close transactions, but as mentioned above, more generally, the external application 220 can facilitate aiding clients in a variety of contexts where information flow is driven by the application state 224. The external application can also include a contract broker SDK 222. The SDK can be an instance of a library of functions, application interface, or a framework.

In operation, the external application 220 registers a need on a centralized broker server, which can cause a corresponding request to a client user device for personal data satisfying the need. In an aspect, the external application's need is registered in a secure registry and includes for example an 'App ID' identifying the application, 'Need ID' identifying the nature of the registered need, and a 'Metadata Specification'. The metadata specification can define by way of metadata what data is needed and in what format the data must be provided to the external application.

In an aspect, architecture 20 may also include a browser application or a client interface application 230 that is in communication with the external application and exchanges data and instructions therewith. As mentioned above, the browser can exchange information with the external application and/or contract broker using JavaScript or another communication modality.

The components of architecture 20 may communicate with one another using any conventional or later-developed means of data communication. The components may be remotely locate from one another and communicate over wired, wireless or networked communication systems, including using relays, routers and network communication switches not shown in the drawing but understood by those skilled in the art. In an aspect, the communications between the contract broker 200, client device 210 and the external application 220 may take place over the Internet using a secure communication protocol. We discuss several data flows and scenarios for the configuration and operation of architecture 20, which are provided as exemplary embodiments and which can be generalized or modified to suit a particular application as would be appreciated by those skilled in the art.

Figure 3:
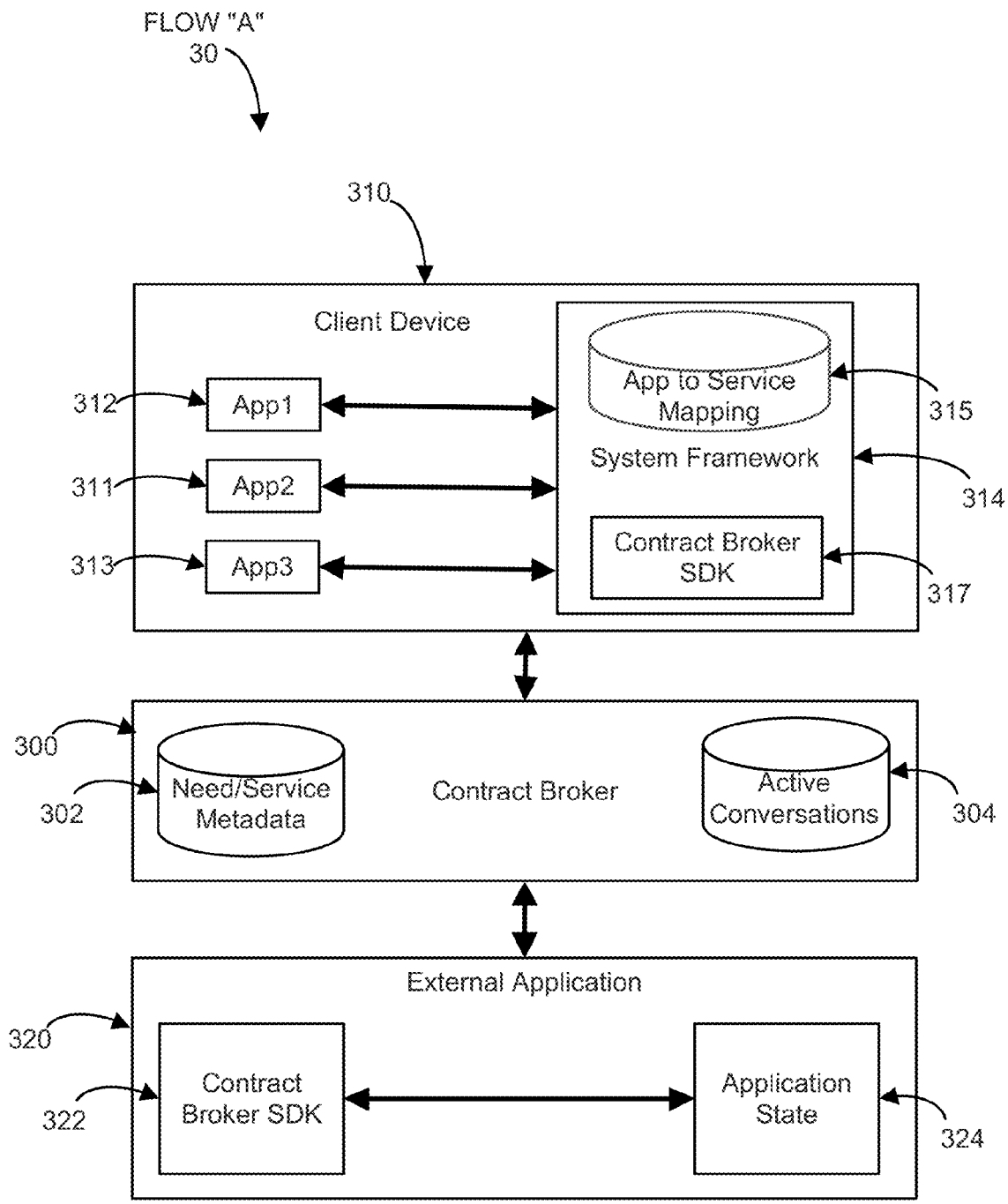
FIGS. 3-6 illustrate a set of exemplary data flows according to embodiments of the present invention.

FIG. 3 illustrates a first data flow 30 ("FLOW A") according to an exemplary embodiment. Client device 310 has several apps 311, 312, 313 (App1, App2, App3) installed, which interact with the system framework 314 on the client device 310. As described earlier, the system framework 314 can include a contract broker SDK 317 and an App to Service mapping store 315. The configuration is done in a pre-discovery phase. The client device 310 is configured to associate the device, its location, and its Apps 311, 312, 313 with the client contract broker SDK 317. Entering an environment such as a retail store with consumer device 310 would trigger a system level interaction with other configured devices and applications by way of the contract broker. In an aspect, a wireless proximity sensor, indoor positioning system or outdoor global positioning (GPS) system can also provide location services to the client device. These activities are carried out during a service discovery phase. The external applications will need to respond to the needs of the client device to conclude a brokered transaction with it. Alternatively, once the client device's presence has been sensed, the external applications can initiate transactions or solicit interactions with the client device through the contract broker as described herein. A location-aware device, e.g., an 'iBeacon' (or similar) device would respond to the presence of the client device with its own ID type and subtype. The system framework will accept the ID and data sent to it and register itself with the contract broker to enable interactions among registered devices and according to rules and needs set by the registered devices. In an aspect, an application delegate method is invoked with App IDs to present corresponding applications to a user of the client device so as to allow the user to manually opt-in to an active 'conversation' with other devices using the contract broker. Once the devices are actively registered in an active conversation through the contract broker, the external application can inform the contract broker of any change of state of the external application and can inform the contract broker of its needs and interaction points, which can be communicated back to the user's client device. The client device can respond to requests and needs of the external application. For example, if an external application requires a log-in then the client device can respond with user name and password credentials. The client device may request metadata from the contract broker associated with a specific need.

Figure 4:
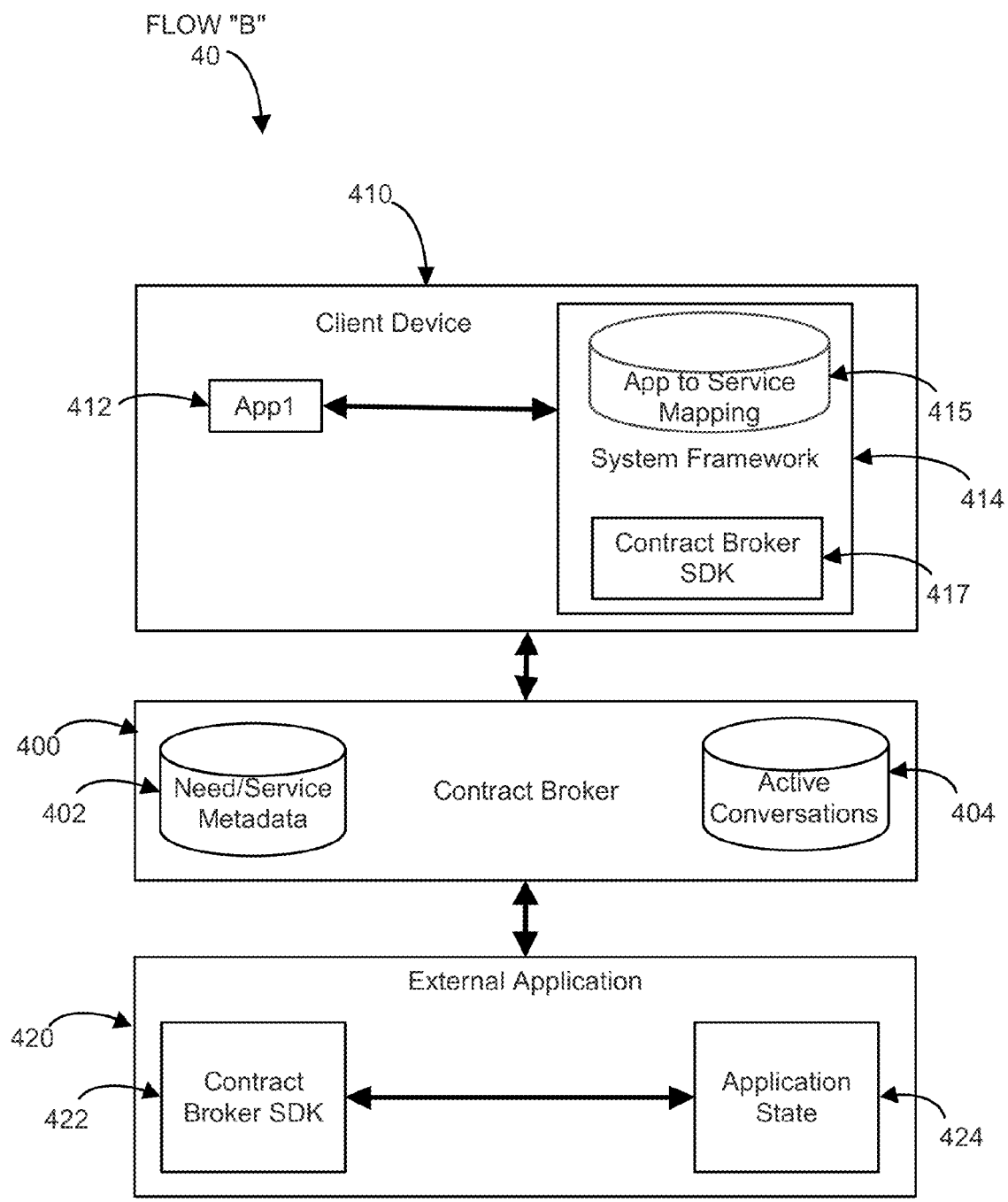

FIG. 4 illustrates another flow (FLOW 'B') 40. The components in FLOW B 40 are similar to the ones described earlier. Here, the client device 410 has been configured in a pre-discovery phase to associate the device and/or location with the contract broker API. The client device 410 registers a positioning or location (e.g., GPS) trigger indicating proximity to a known place of interest (e.g., the owner's home, work or other establishment) and system level interactions can take place. The system framework delegates directly to registered external applications and the client device and App are in an active conversation with the contract broker. The client device 410 can provide needed information to the contract broker 400 and avoid unnecessary direct communication with the external application 420 itself. Depending on the rules set by the client device, it can request that the contract broker provide data to the external application on behalf of the client device. For example, in the case of the client device needing to log in to an external application, the client device can provide log-in credentials to the contract broker and the contract broker provides needed information securely to the external application. In some embodiments, long polling, push, or stream based communication is used between the client device and the contract broker. The communication with the contract broker can be over a network, e.g., the Internet, and may use wired or wireless connections and various communication protocols as appropriate.

When the client device leaves the area in proximity with an external sensor the active conversation can be put on hold or disconnected. The client device may actively log out of the active conversation, or a time-out situation can interrupt the active conversation.

Figure 5:
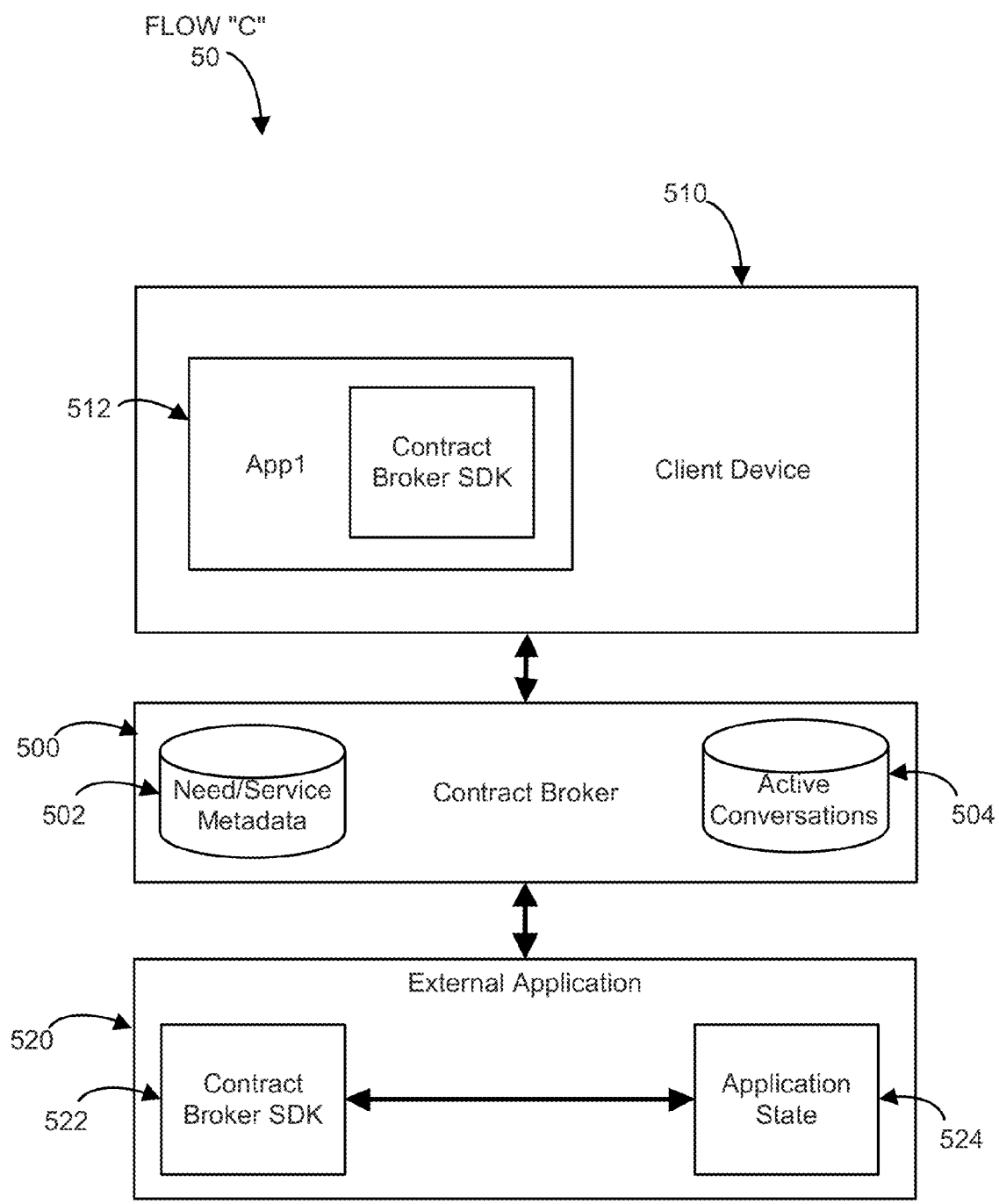

FIG. 5 illustrates yet another flow (FLOW 'C') 50. The client device 510 has adopted the contract broker API. The user opens the adopting App, triggering application level interactions. The user of the client device 510 can scan a code on the client device, which allows the adopting App 512 to join an active conversation external application 520 through the contract broker 500.

Figure 6:
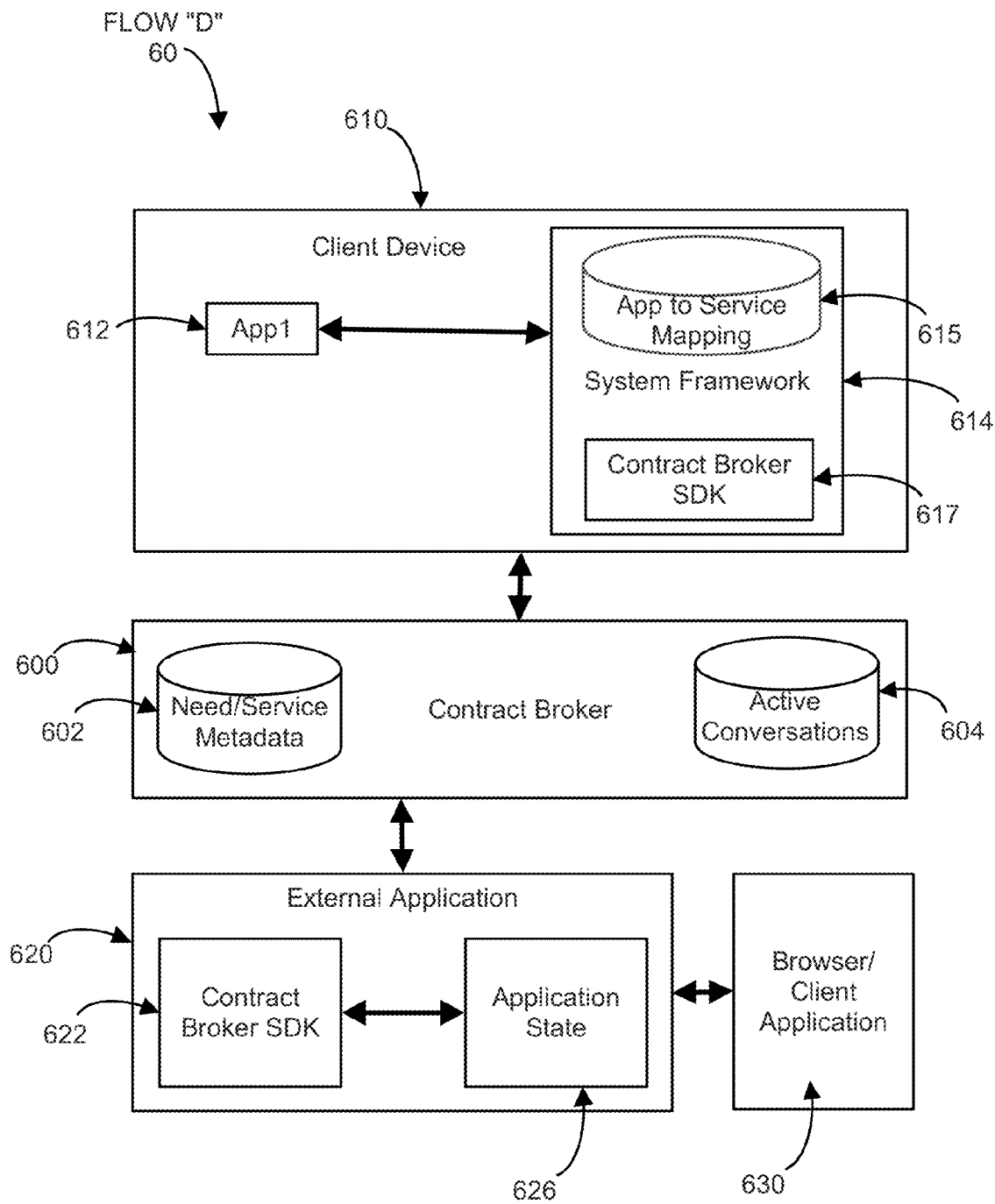

FIG. 6 illustrates still another flow (FLOW 'D') 60. The client device 610 has adopted the contract broker API and opens the adopting App, triggering application level interactions as discussed above. The user of the client device 610 can scan a code on the client device, which allows the adopting App 612 to join an active conversation external application 620 through the contract broker 600 as described above. A server-side contract broker adoption 'badge' may be displayed on an application (such as a browser client 630) during the pre-discovery phase. In the service discovery phase, the user interacts with the Web site badge to produce a visual representation such as a bar code, QR code, or other displayed token or representation that permits application-system framework interaction. The user scans a code on the client device 610, which allows the App 612 to join active conversations with a browser application 630.

In some aspects, the user of the client device can control his or her interactions with an ad-hoc external application through the brokering server or contract broker described herein. Consider for example that the present method and system allow interactions between a client device and an external application embedded into an arbitrary entity or apparatus such as an external POS machine, a web browser, or other embedded system in an appliance, vehicle, etc.

Whereas existing client-server systems are generally only adapted to one type of interaction, the present system allows the external application to send ad-hoc requests for information in the form of metadata requests that encode the type and format of the personal data needed by the external application to fulfill its need in order to complete a transaction with the client device. So if the client device is a smartphone and the user of the smartphone is in a store purchasing an item, the external application may be embedded in a POS register. The user can indicate to the store clerk (or press a button on a checkout kiosk) stating that the user wants to pay using his or her contract broker. The external application of the store and the client device of the user then establish a trusted connection to a remote contract broker server or service. From that point on, the user client device does not need to send sensitive personal data to the store or the POS register or the clerk. But rather, the external application at the store will encode its needs into need metadata (the needs being able to be ad-hoc or arbitrary) and these needs encoded in the metadata can be sent to the contract broker server, which will accept the request for personal data and relay that to the client device. Also, unlike many existing systems, the client controls its personal data. The personal data is formatted by the client and/or the contract broker as needed to complete the transaction with the external application. However, the personal data is preferably not kept on the contract broker or on the cloud or other data stores other than in the user's client device. Accordingly, the user has the security of keeping his or her personal data locally and controls all his or her interactions with external entities through his or her trusted device.

The transaction between the client device and the external application could be initiated by either or both of these entities by contacting the contract broker.

It will be appreciated that not only is the personal data kept on the user's device but the user of the device can personally control the release of the personal data and only permit a subset of the personal data needed to perform a transaction be released. There are rules that can be set by the external application or by the user to complete transactions with one another.

As will be discussed below, the user of the client device can selectively choose which card to use to pay for a product at a store with a swipe or click of a finger. The user can authorize payments and other information for payment or shipping arrangements.

As mentioned above, the client device can rely entirely on the contract broker to deliver personal data as necessary to an external application. However, the client device can use the contract broker to receive metadata from the external application indicating what personal data is needed to complete a transaction or indicative of a state of the external application. The client device can then directly give to the external application, through a machine sensor or reader, the select subset of information the external application is asking for.

In the context of generalized interactions with devices in the user's environ, there can be external applications embedded into devices and appliances in the user's home, work, or other environment. These are now able to interact with the user through his or her client device containing the user's personal data. We now discuss embodiments of the client device and aspects of delivery of personal data from the client device to the external application if this method of returning personal data to the external application is chosen. That is, we now describe how the client device delivers personal data in an ad-hoc and secure way, having received an indication from the contract broker of the type of data needed by the external application.

Figure 7:
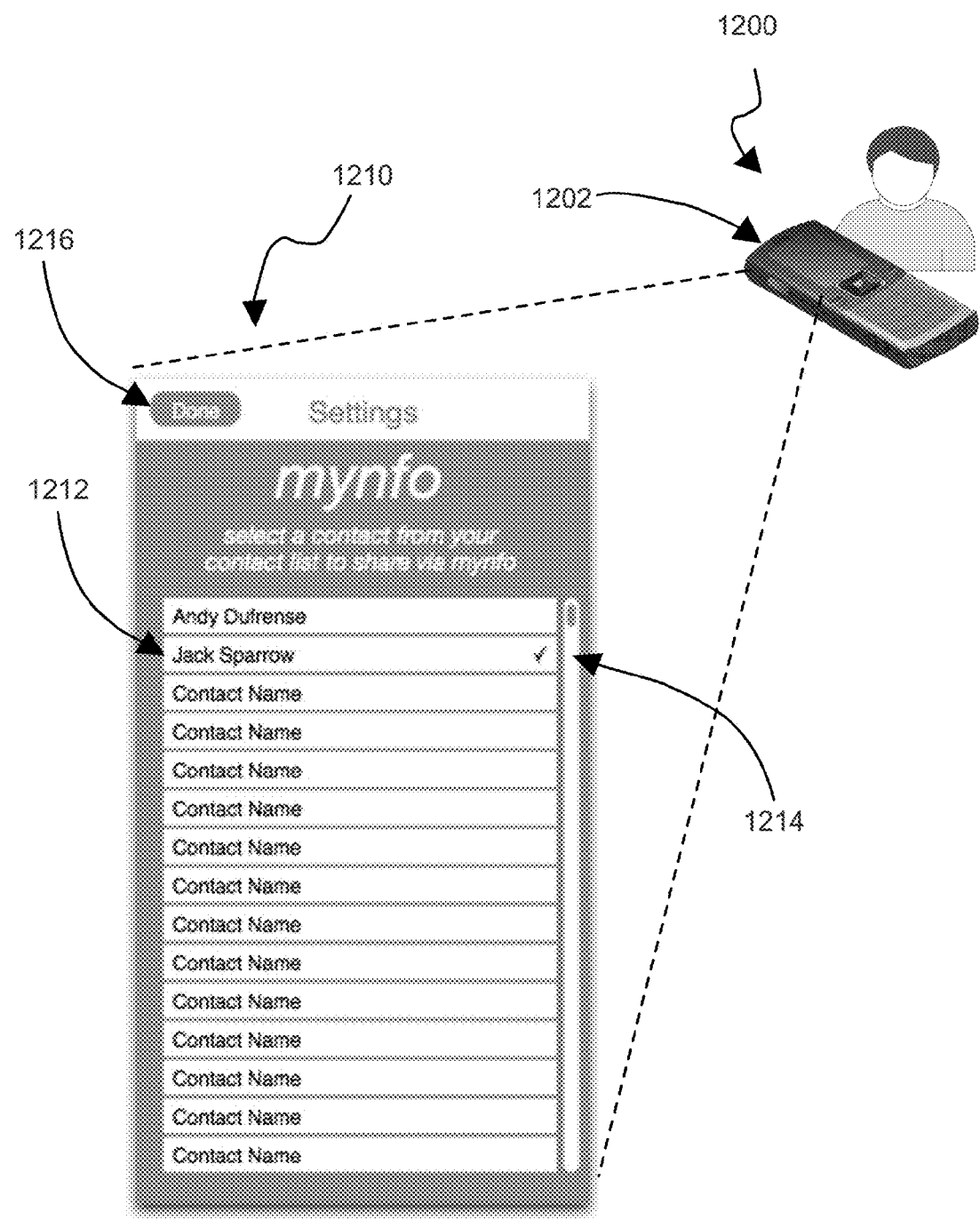
FIG. 7 illustrates an exemplary Settings screen display of a personal data sharing application.

FIG. 7 illustrates a client device 1200 such as a smart phone, tablet, or similar mobile personal communication device. Device 1200 is typically in the form of a portable processing apparatus housed in a device housing having a processing unit, digital memory storage unit, communication unit, and rechargeable power unit. In addition, device 1200 includes audio and/or visual user interface units such as a visual display 1202, buttons, scroll wheel, track ball, microphone, and speaker unit. The visual display 1202 may be of a touch-sensitive type that displays visual information but also accepts input from a user by way of the touching, swiping or other use gestures entered using the user's hand or stylus device. Device 1200 is designed and configured to receive, store and execute machine readable or programmed instructions. The instructions can be received over a communication port (sync bus or wireless connection), downloaded into the device 1200's memory at the time of manufacture, or otherwise loaded using an external memory device and interface. Importantly, device 1200 can then perform programmed functions by manipulating and changing stored information in the device 1200 to cause the presently-described functions of the device. This configuration is sometimes referred to as an application, which can be one of many software modules or programs running on device 1200. Overall, the device 1200 can include a base set of software acting as an operating system.

In the example shown, display 1202 presents an output generated by an application and representing Settings screen 1210 of a personal data sharing application running on device 1200. The Settings screen can present any of an unlimited number of viewable outputs to the user of course, but the presently shown examples are merely given for the sake of illustration. A plurality of contacts 1212 are available for the user to select from. The user can browse or scroll through the contacts to select one of the contacts 1212 using any suitable user input mechanism such as a touch screen, scroll bar 1214, scrolling wheel, ball, mouse, voice input, etc. A selected contact 1212 may be indicated by a check mark, radio button, highlighting, or other indicator. In an embodiment, a user has a default contact that first comes up as selected in the Settings screen 1210. In an embodiment, the device owner's contact information may be the default selection, which may be enabled in devices whose operating systems or software support an application programming interface (API) including a 'me' or 'owner' aspect. Actuating a 'Done', 'Home' or 'Exit' or equivalent button 1216 sends a signal to the application and device causing the display 1210 to go to a Home screen as will be discussed below.

Figure 8:
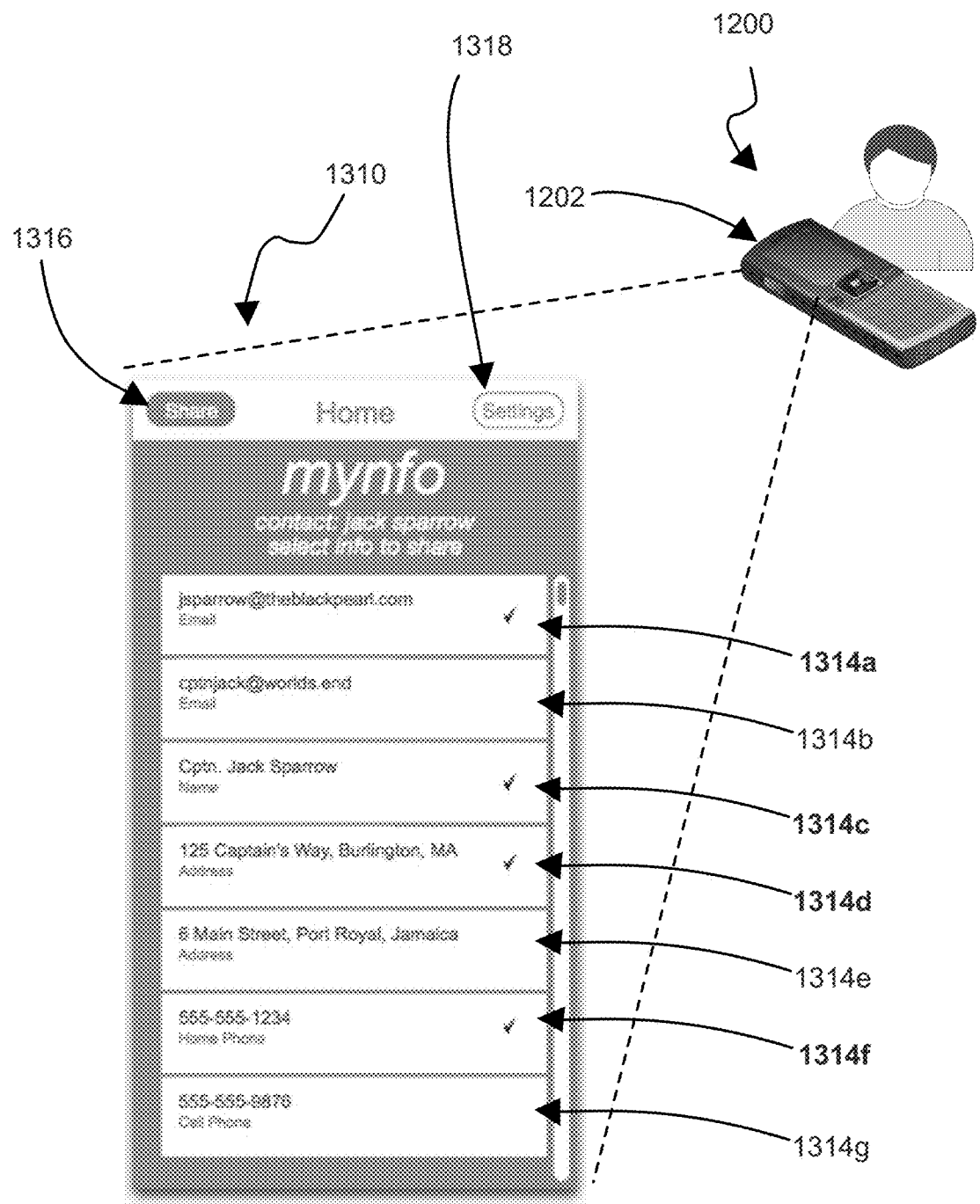
FIG. 8 illustrates an exemplary Home screen display of the personal data sharing application.

FIG. 8 illustrates an exemplary Home screen 1310 of the instant personal data sharing application as shown on display 1202 of device 1200. The Home screen 1310 comprises graphical visual output information including the user's personal data 1314. The application allows the user (who is the owner of the personal data) to use the user interface of the application and device 1200 so as to select a subset of personal data 1314 to share. The selected items of personal data 1314 are indicated with a check mark, highlighting, radio buttons, etc. In this example, the user can touch the device's touch screen to select which items of personal data 1314 to share with another party such as a merchant at a point of sale in the context of a transaction between the owner of the personal data (user) and the merchant. Here the user selects an Email 1314*a*, Name 1314*c*, Address 1314*d*, and Home Phone 1314*f* to share with the requesting party. In this way the owner of personal data can select to share only the necessary pieces of personal data 1314 needed to conduct the transaction at hand. The other pieces of personal data stored in device 1200 (e.g., Cell Phone 1314*g*) are not selected or shared. By doing so the system and application eliminate or significantly reduce the likelihood of unwanted discovery of the sensitive personal data that was not selected for sharing.

The Home screen 1310 also presents a 'Share' button 1316 that consummates the generation of the output for sharing the selected personal data 1314 as will be discussed below. A 'Settings' button 1318 can return the system and application and screen to the 'Settings' screen 1210 as described earlier. Note that the names given to these buttons and elements in the present examples (e.g., 'Home', 'Settings', 'Share', etc.) are merely illustrative, and can be generalized as would be appreciated by those skilled in the art. In an embodiment, selecting or pressing the 'Share' button 1316 causes the application and the device 1200 to generate an electronic representation of the selected personal data 1314. In a particular example, the electronic representation generated comprises a bar code that uniquely represents the selected personal data but not the personal data that was not selected. In another example, the electronic representation generated comprises a QR code or two-dimensional pixelated code that uniquely represents the selected personal data but not the personal data that was not selected.

Figure 9:
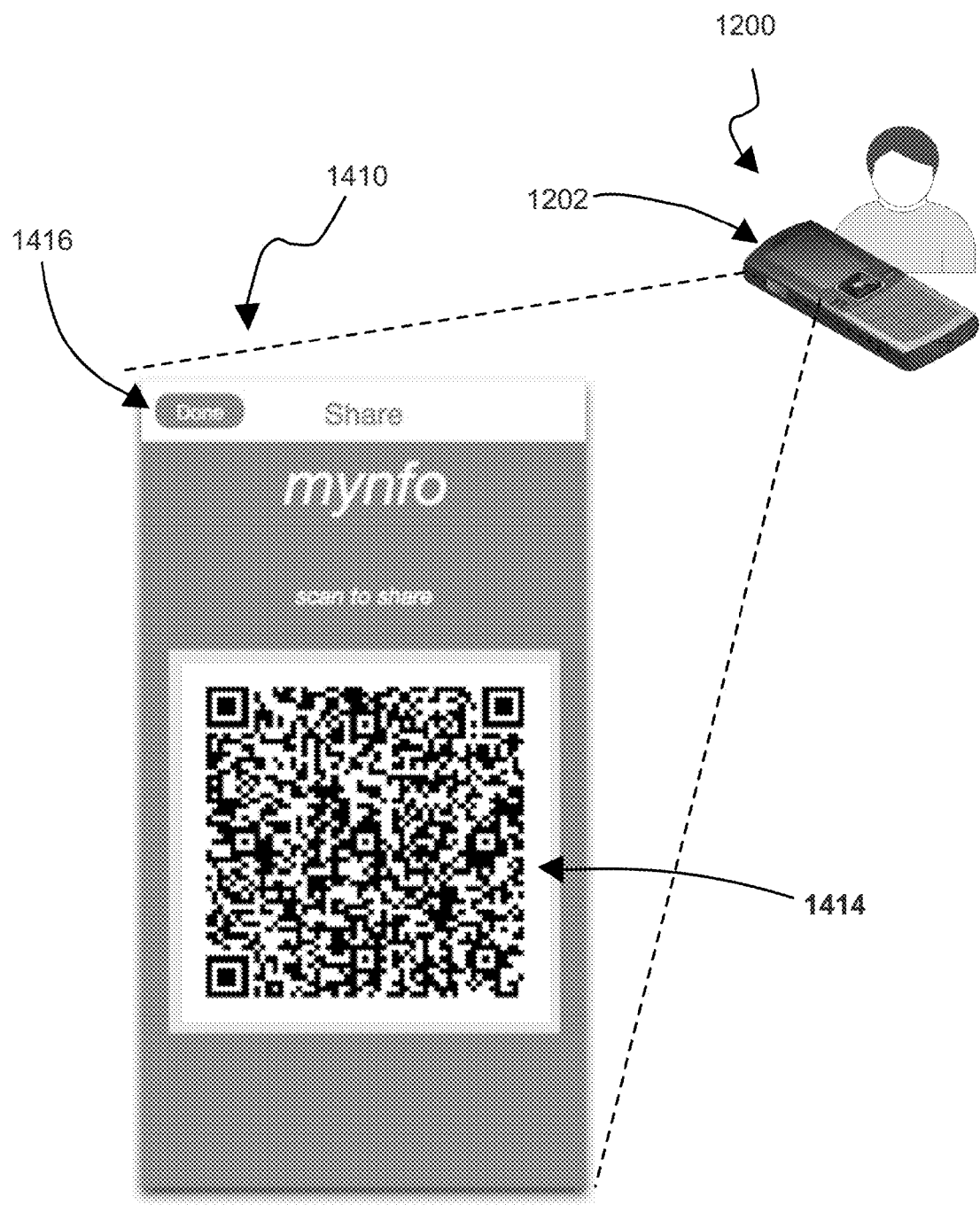
FIG. 9 illustrates an exemplary Share screen display of the personal data sharing application.

FIG. 9 illustrates another output of display screen 1202, which we refer to as a Share screen 1410 for the sake of illustration. The Share screen 1410 is displayed on the screen 1202 once the owner of the personal data has selected the selected pieces of personal data 1314 he or she wishes to share with another party. The Share screen 1410 primarily presents a visual output 1414 that is an electronic graphical representation of the selected personal data and not the personal data that was not selected. The electronic representation 1414 can be in the form of a traditional bar code, QR code or other similar output. The electronic representation 1414 is formatted onto the display screen 1202 in a format readable by scanners and electronic readers of such information. In an aspect, since the electronic representation 1414 is machine readable and generally not human readable, it is substantially immune from unwanted reading by bystanders or the clerk operating the merchant's POS equipment (e.g., checkout register). In this way the personal data is secured in two ways according to the above discussion: first, only the necessary requested pieces of (selected) personal data is formatted into the electronic representation 1414; and second, the electronic representation is not human readable and so is only read by the POS equipment (scanner) directly from the device display 1202.

Figure 10:
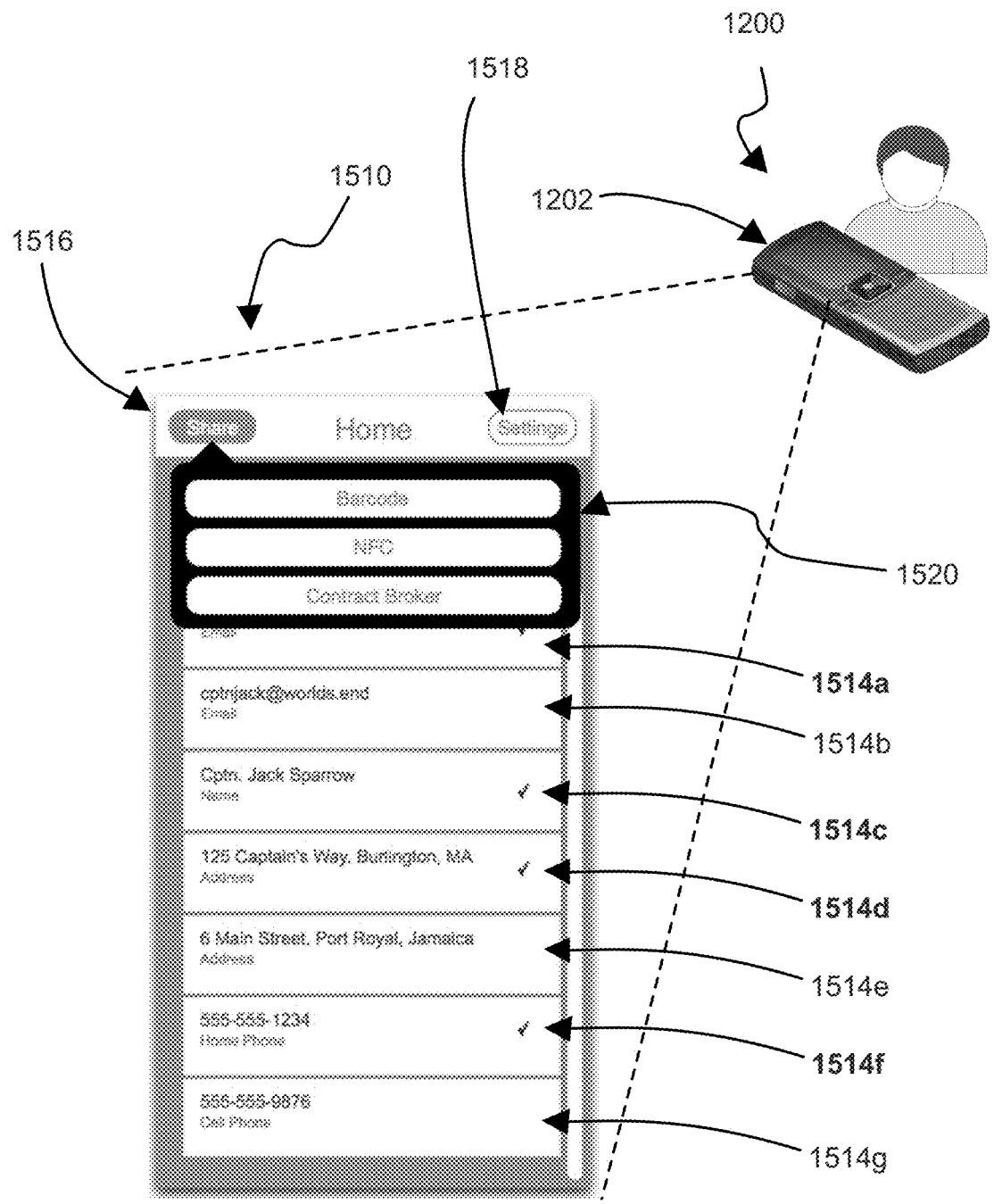
FIG. 10 illustrates an alternative Home and sharing modality menu of the personal data sharing application.

FIG. 10 illustrates another embodiment of a Home screen 1510 displayed by the personal data sharing application running on device 1200. Here the Home screen 1510 again displays a plurality of pieces of personal data 1514 from which the owner of the data can select a subset (shown as checked or highlighted) for sharing. Once the needed pieces of personal data are selected, the 'Share' button 1516 or other user interface element is actuated to generate a sharable electronic representation of the selected personal data. In an embodiment, a plurality of formats for the sharable electronic representation are offered in a format selector 1520. The format selector can offer the user two or more types of electronic representations, which can include a bar code, two-dimensional pixelated code (e.g., QR code), or near field communication (NFC) tag. If the user chooses a NFC or equivalent representation, a NFC tag is generated containing the selected personal data but not the personal data that was not selected. The NFC tag can be wirelessly provided to a suitable reader, interrogator or active device in a radio frequency emitted by device 1200 from an antenna therein to a receiving antenna in the NFC tag reader. The NFC communication can be limited to a short range so that it adds yet a third layer of security to the two given above: that is, the NFC containing the selected personal data is limited to only those NFC readers located within a short range of the transmitting device 1200.

The 'Settings' button 1518 of Home screen 1510 can return the screen to the previously-described Settings screen or other screen in the application.

Figure 11:
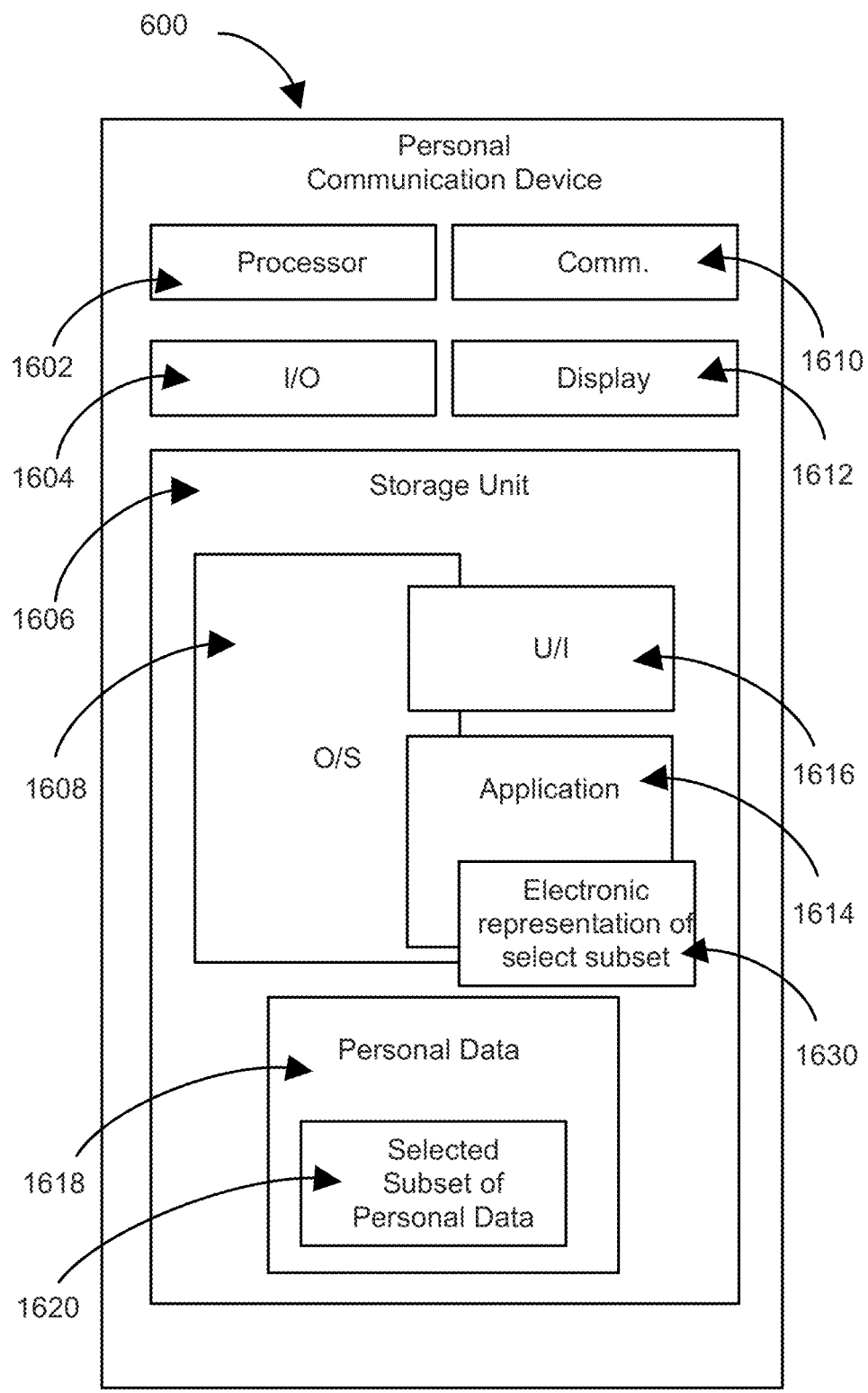
FIG. 11 illustrates an exemplary block diagram of a personal communication device according to the present disclosure.

Accordingly, a personal communication device is presented, which operates according to the method described above. FIG. 11 illustrates a personal communication device 1600. The device 1600 includes a processor 1602 that can run, process or execute machine-readable programmed instructions. The processor 1602 for example runs an operating system O/S 1608 program that controls the behavior of the device and facilitates the execution of application programs such as the persona data sharing application 1614. The device 1600 also includes a user interface U/I 1616, which operates in conjunction with input/output I/O devices 1604 (e.g., touch pad, mouse, track ball, keyboard, microphone, device buttons, etc.). The U/I 1616 also operates in conjunction with a visual display 1612 adapted to present visual information on the screen (e.g., LCD, LED, OLED, or similar screen). The U/I 1616 and display 1612 can operate together to facilitate input of information and signals from a user's touch on the screen, and to output readable information and output to the user of device 1600.

Personal data sharing application 1614 allows an owner of personal data to select a subset of personal data 1620 from a set of personal data 1618 available in the device's storage unit 1606.

Furthermore, the display 1612 of the personal communication device 1600 is configured and arranged to illuminate segments of said display 1612 in accordance with the given set of selected personal data 1620.

In other aspects, the device 1600 includes a communication unit 1610 such as a wireless input/output communication module having a radio transceiver and antenna operating according to a determined communication protocol. The communication unit 1610 outputs electromagnetic energy signals in accordance with the given set of selected personal data 1620.

In addition, the device 1600 through its application 1614 can offer on a touch-sensitive display 1612 and/or user interface 1616 a plurality of methods or modalities for sharing a selected subset of personal data 1620. The user can use touch sensitive display 1612 and/or user interface 1616 to enter a choice of which of said plurality of methods or modalities with which to share selected data 1620.

Figure 12:
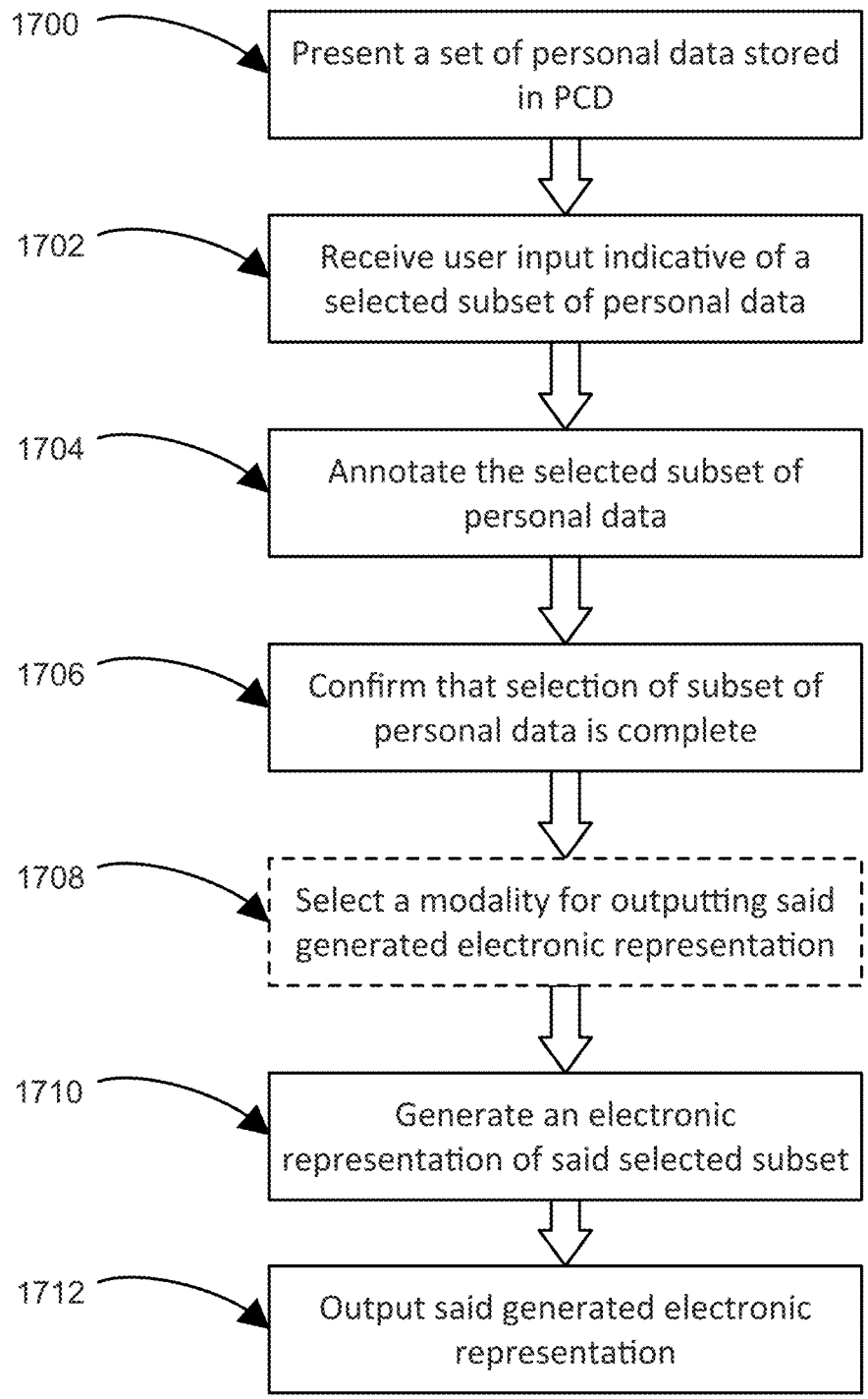
FIG. 12 illustrates an exemplary method for sharing selected personal data from a personal communication device.

FIG. 12 illustrates an exemplary method for securely and selectively sharing personal data from a personal communication device. The device presents a user with a set of personal data stored in the personal communication device (PCD) at 1700. The user is invited to select a selected subset of the stored personal data and the system receives the user's selection of a selected subset of personal data at 1702. The selected personal data is annotated at 1704. The user confirms at 1706 that the selected annotated personal data is to be shared with another party. The user is optionally directed to choose a modality or method by which the selected subset of personal data is to be shared at 1708. The system then generates an electronic representation of the selected personal data but not of the personal data which was not selected, according to the chosen sharing modality, at 1710. Finally, the system outputs the generated electronic representation, which may be visual (e.g., a pixelated code on a display screen) or may be an electromagnetic transmission (e.g., a radio wave signal) at 1712, and the electronic representation of the selected personal data is provided as shared data to the other party.

Figure 13:
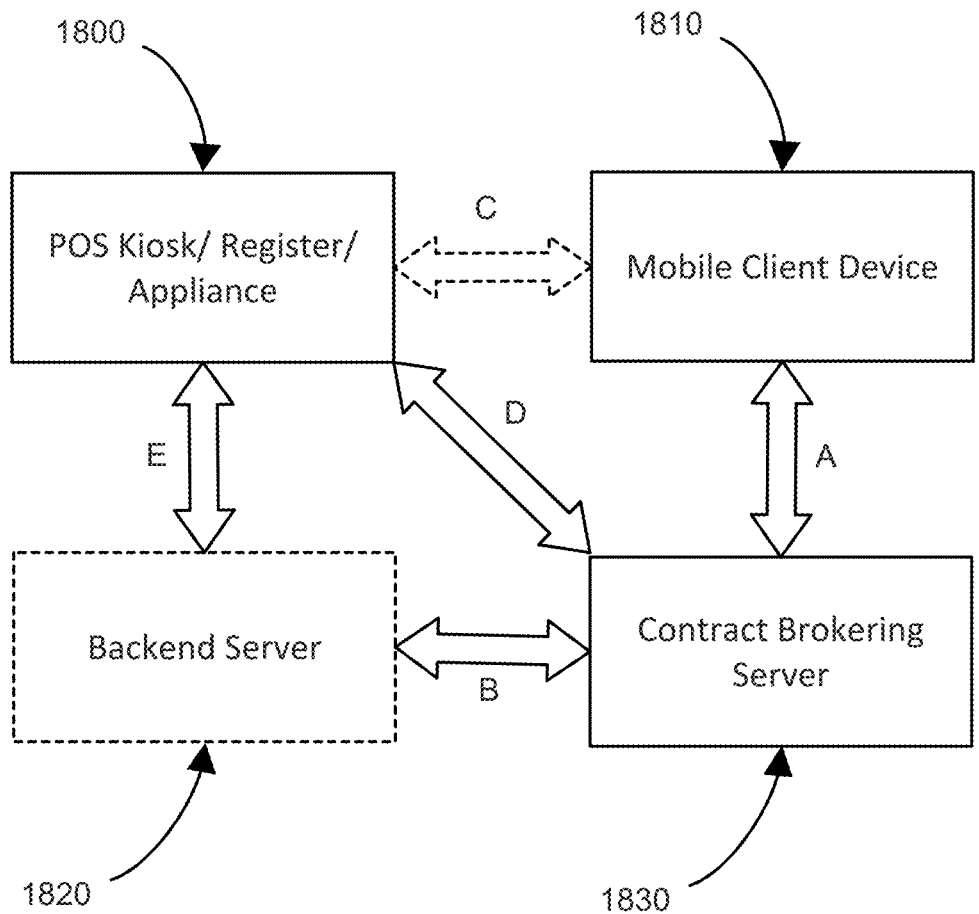
FIG. 13 illustrates an exemplary architecture of a system interacting according to the present disclosure.

FIG. 13 illustrates an exemplary set of communication pathways according to the present disclosure. The components communicating are a mobile client device 1810 belonging to a user and being trusted by the user to hold the user's personal data. The client device 1810 can communicate preferably using a wireless modality such as cellular or WiFi or other method. A contract brokering server 1830 includes a contract broker as described previously. An external point of sale (POS) kiosk or register or appliance 1800 running an external application (collectively referred to in this example as an "external application 1800" for simplicity) is present at a place of business, but can be interchanged with any device or appliance the user/mobile device wish to conduct transactions with. The backend server 1820 is a computer device connected to external application 1800 over a network. The following describes various modes of interaction and communication between these components, as not each component is required to be directly coupled to the others shown in the drawing.

The mobile client device 1810 and the contract broker 1830 are generally able to communicate over a communication link "A". Typically, the communication link "A" is a link carrying information over the Internet. For example, the link may include at least one wireless sub-link coupling a wireless hand-held device 1810 with a network over a cellular or WiFi or similar connection. Then, the contract broker 1830 is connected to that network or other link to receive and transmit information to the device 1810. As stated before, personal data is kept on the client device 1810, but the trusted contract broker 1830 can update the device 1810 as to a status or state of external application 1800, and can receive needed personal data from device 1810 according to requested metadata as described earlier.

If external application 1800 is configured to manage its own transactions (e.g., using a SDK or API) it can communicate with contract broker 1830 directly over a link "D". Link "D" can be a wired and/or wireless (or hybrid) communication link, and can include links over the Internet or other WAN or LAN connection. In this way, the external application 1800 can directly manage its requests and responses over link "D" with the contract broker 1830, which will relay and negotiate these requests and responses to client device 1810.

The client device can optionally (shows with dotted lines) manage some communications with the external application 1800 over link "C". For example, if the client device 1810 is located in a retail store or in a home or workplace of the external application 1800, the client device 1810 may send limited signals to the external application 1800 device telling it that the user of the mobile client 1810 wishes to use the contract broker 1830 to complete a transaction. Or, as described above, the client device 1810 can deliver a final encoded electronic representation (bar code, QDR code, NFC code) to the external application 1800 using a corresponding reader on the external application.

In some cases the external application 1800 is configured to conduct transactions using a backend server 1820. The backend server 1820 can be or include an e-commerce server as understood by those skilled in the art, but also be configured with a SDK or API for the contract brokering transactions as disclosed herein. This can be useful in the case of a franchise retail chain having POS kiosks and registers at the retail store outlets that are connected to the backend server 1820 of the stores through a communication link "E". The backend server 1820 can then act to pass information to and from contract broker 1830 over communication link "B". The backend server 1820 can thus merely inform the POS kiosk/register 1800 that personal data needed to complete a transaction (e.g., sale) has been received and that the customer can leave the store with the purchased merchandise in an example.

The following describes an exemplary transaction for the sake of detailed illustration of an instance of use of the present architecture. Consider a customer who enters a retail store with his or her mobile client device (e.g., smartphone) 1810 and wishes to purchase an item with the help of a contract broker 1830. In this example, the store employs a backend e-commerce server 1820.

The customer selects the item off of the shelf at the retail store and takes it to a checkout kiosk or register 1800. A sales associate (cashier) of the retail store rings up the item in the kiosk or register 1800. The customer indicates verbally, or using a press of a button at the kiosk 1800, or a wireless signal from his or her device 1810 that the customer intends to pay using contract broker 1830. The external application in register 1810 sends a signal to backend e-commerce server 1820 indicating the nature of the transaction (e.g., store's ID, merchandise item ID, price, SKU number or other such information) to the backend server 1820 to create a new order. The backend server 1820 sends a communication to the contract broker 1830 indicating what is needed by way of personal data to carry out the transaction. These needs are encoded in metadata, optionally specifying the format of the response, as stated before. The contract broker 1830 conveys to the customer's client device 1810 what personal data is needed to complete the transaction (using said metadata or a revised version containing it). The customer is asked by way of a user interface of the client device 1810 to provide the needed personal data, for example by approving a select subset of personal data as described in earlier examples. Once the needed data (subset of personal data) is returned from the device 1810 to the contract broker 1830, the contract broker 1830 can provide it to the backend server 1820 of the retailer. Finally, the retailer's backend server 1820 will confirm to the POS external application 1800 that payment has been received and the customer may leave the store with the purchased item. Confirmation (receipts) of the transaction can be generated by the POS and handed to the customer, or an electronic or other receipt can be sent to the customer by way of the contract broker. At each step, the communicating entities can provide acknowledgement or confirmatory signals to one another as understood by those skilled in the art.

In an alternative embodiment, once the customer's client device 1810 is prompted to provide the needed personal data, the client device 1810 and customer can "bundle" the needed subset of personal data into an electronic representation of the subset of personal data, which can be transmitted to an electronic reader (QDR, bar code, NFC, Bluetooth, other) in the POS directly rather than sending this information back through the contract broker 1830 and backend server 1820.

Figure 14:
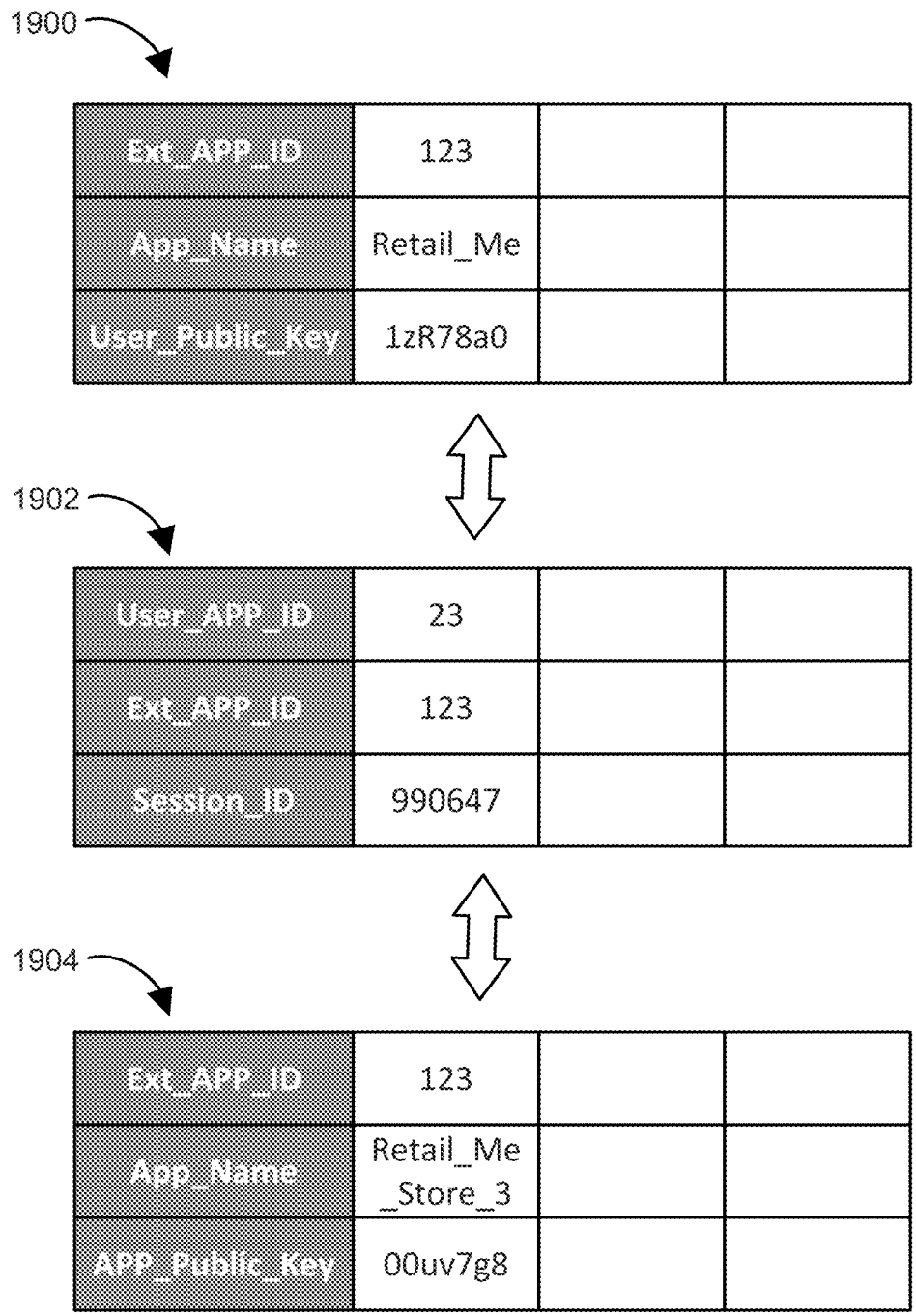
FIG. 14 illustrates an exemplary group of data stores containing information used in managing communication and authentication between the components of the present system.

FIG. 14 illustrates exemplary depictions of data and data structures, which can be stored in one or more data stores according to the present disclosure. A first (client) data store 1900 is kept on the user's client device described above. It includes a representation of a User_APP_ID identifying the contract broker compliant app running on the client device of the present invention. It also includes an App_Name that can be the name of the app needed for conducting transactions with a given retailer or appliance or external application. It also includes a User_Public_Key used to authenticate communications with external devices or a contract broker.

A second (external) data store 1904 is kept on an external device such as a retail store POS kiosk/register, user appliance, vehicle, and so on running an external application that is contract broker compliant. Contract broker compliant things are configured and arranged to use the present contract broker and methods for example by including hardware and/or software SDK, API or other elements accordingly. The external data store 1904 includes an identification of the external application ID (Ext_APP_ID) and its name (App_Name) as well as the external APP_Public_Key for managing secure communications with the contract broker or other devices. The public keys may be used in a public key encryption (PKI) or other communication method as understood by those skilled in the art.

Yet another third (contract broker) data store 1902 is kept in a data brokering server. This data store 1902 represents active conversations as described above and includes a table of User_APP_ID, Ext_APP_ID and Session_ID entries to manage the communications needed to satisfy a transaction between the client device and external application.

The present invention should not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method for machine-assisted execution of a transaction, comprising:
   providing a brokering server to broker exchanges of personal data between a client device and a machine running an external application, said brokering server, said client device, and said machine each having a respective microprocessor;
   storing a record of active connections between said client device and said external application in said brokering server;
   in said machine, encoding a plurality of ad-hoc requests for information required by said external application to complete said transaction in the form of needs metadata;
   in said brokering server, receiving said needs metadata from said machine;
   delivering said needs metadata from said brokering server to said client;
   in said brokering server, receiving personal data from said client corresponding to said needs metadata; and
   returning said personal data, corresponding to said needs metadata and responding to said ad-hoc requests for information, to said external application running on said machine by way of said brokering server so that the personal data does not need to pass directly from said client to said external application.

2. The method of claim 1, further comprising installing a library in both said client and in said machine to manage communications by each of said client and said external application with said brokering server.

3. The method of claim 1, further comprising, in said machine, defining an external application state corresponding to said needs metadata, the needs metadata encoding said external application state in an ad-hoc fashion so as to represent an ad-hoc condition of the external application and ad-hoc needs of the external application.

4. The method of claim 1, said machine including a point of sale device, and further comprising generating a machine-readable graphical output on a display of said client, the graphical output representing personal data required by said rules of said external application so as to complete said transaction at said point of sale device.

5. A method for conducting a transaction, comprising:
   detecting, using a location detection device system, the presence of a client device in or proximal to a point of sale device containing an external application;
   receiving, at a brokering server, from said external application, a plurality of metadata representing a state of said external application and representing a plurality of ad-hoc rules of said external application required by said external application to complete said transaction;
   providing said metadata from said brokering server to said client device;
   in said brokering server, receiving from said client device a plurality of personal data corresponding to said metadata and said ad-hoc rules;
   in said brokering server, formatting said personal data according to a format specified in said metadata so as to generate a set of formatted personal data corresponding to said metadata and ad-hoc rules;
   returning said formatted personal data from said brokering server to said external application so as to satisfy said ad-hoc rules and complete said transaction,
   wherein said point of sale device, said location device system, said brokering server, and said client device each have a respective microprocessor.

6. A method for securely sharing selected personal data, comprising:
   presenting to a user a set of personal data stored in a personal communication device, said personal communication device having a microprocessor;
   in said personal communication device, receiving at least one user input indicative of a subset of said personal data selected by said user for sharing with another party;
   in said personal communication device, annotating the subset of personal data to show which selected personal data will be shared with said other party;
   in said personal communication device, receiving further user input indicating that the user has completed selecting the subset of personal data to be shared; and
   in said personal communication device, generating an electronic representation of said subset of personal data, said electronic representation encoding said selected personal data but not encoding other personal data that was not selected.

7. The method of claim 6, further comprising transmitting said electronic representation of said selected personal data from said personal communication device to a device other than said personal communication device.

8. The method of claim 6, generating said electronic representation comprising generating a bar code output on a display screen of said personal communication device encoding said selected personal data but not encoding other personal data that was not selected.

9. The method of claim 6, generating said electronic representation comprising generating a two-dimensional pixelated output on a display screen of said personal communication device encoding said selected personal data but not encoding other personal data that was not selected.

10. The method of claim 6, generating said electronic representation comprising generating a near field communication tag in said personal communication device encoding said selected personal data but not encoding other personal data that was not selected.

11. The method of claim 6, further comprising, in said personal communication device, presenting a plurality of available formats for generating said electronic representation and receiving an input from a user indicative of a chosen one of said plurality of available formats for generating the electronic representation.

12. The method of claim 6, said generating of said electronic representation comprising generating an electronic representation that is machine readable but not human readable so as to secure the electronic representation from unaided detection by unauthorized persons.

13. The method of claim 6, further comprising displaying said electronic representation on a display screen of said personal communication device in a format suited for scanning by a corresponding scanning machine or reader.

14. The method of claim 6, further comprising transmission of said electronic representation from said personal communication device in a format suited for reception by a corresponding receiver located within a predetermined range of said personal communication device but not outside said range.

15. The method of claim 14, said range being less than ten (10) inches.

16. The method of claim 15, said range being less than two (2) inches.

17. A personal communication device, comprising:
    a hardware processor configured to execute computer-readable instructions;
    an input/output module configured to receive user input signals from a user of said device representative of a choice of said user, and to deliver corresponding user input signals to said processor;
    a storage unit coupled to said processor comprising at least one data store and including a store of personal data and a store of a selected subset of said personal data, said subset of personal data corresponding to said user input signals;
    a display screen configured to receive display signals from said processor, said display screen further configured to illuminate segments of said display in accordance with the selected subset of personal data.

18. The personal communication device of claim 17, further comprising a communications transceiver that transmits electromagnetic signals in accordance with said selected subset of personal data.

\* \* \* \* \*